United States Patent [19]

Grzybowski et al.

[11] Patent Number: 5,004,772

[45] Date of Patent: Apr. 2, 1991

[54] ASPHALT ROOFING COMPOSITIONS ESPECIALLY ADAPTED FOR COLD APPLICATIONS

[75] Inventors: Kenneth F. Grzybowski, Temple Terrace; Brian J. Anthony, Tampa, both of Fla.

[73] Assignee: Gardner Asphalt Corporation, Tampa, Fla.

[21] Appl. No.: 438,846

[22] Filed: Nov. 20, 1989

[51] Int. Cl.[5] ........................ C08L 9/00; C08L 11/00; C08L 95/00; C08K 5/01
[52] U.S. Cl. ........................................ 524/62; 524/68; 524/70; 524/71

[58] Field of Search ............... 524/62, 68, 69, 70, 524/71

[56] References Cited

U.S. PATENT DOCUMENTS

| | | | |
|---|---|---|---|
| 2,581,640 | 1/1952 | Fasold et al. | 524/62 |
| 4,781,988 | 11/1988 | Rusek et al. | 428/450 |
| 4,833,184 | 5/1989 | Higgins | 524/62 |

Primary Examiner—Allan M. Lieberman
Attorney, Agent, or Firm—Dominik, Stein, Saccocio, Reese, Colitz & VanDerWall

[57] ABSTRACT

Properties and cold applicability of asphalt elastomer compositions are substantially improved by utilizing cyclohexanone therein as a co-solvent.

3 Claims, No Drawings

ASPHALT ROOFING COMPOSITIONS ESPECIALLY ADAPTED FOR COLD APPLICATIONS

FIELD OF THE INVENTION

Use of asphalt and blends thereof, with elastomers for roofing applications is well known, see e.g., U.S. Pat. No. 4,196,115. The advantage of cold applicability so as to avoid working with a hot material at a job site such as a roof, is also well known, see e.g., U.S. Pat. No. 4,609,696.

The modification of asphalt cold formulations has been achieved through various methods. Asphalts of differing physical characteristics have been blended to offer improved performance characteristics, e.g., elongation, recovery, and weatherability. Organic and inorganic fillers have been utilized to provide reinforcement and resistance to flow. Even the introduction of elastomers has been accomplished via their solvation in aromatic and aliphatic hydrocarbon solvents, or combinations thereof. Solvents currently utilized in elastomer addition can have severe negatives. Many are hazards to both health and environment. Because of the solvency powers required for the elastomers, the solvents are generally extremely flammable. Though the solvents have successfully introduced elastomers to cold formulations their evaporation rates and compatibility have not generally permitted true modifications (elongation, recovery, etc.) of the cured asphalt films.

Blends of various elastomers in hot asphalt have a history of difficulties: (a) high viscosities of blended materials, making the blend difficult to apply; (b) most elastomers are heat sensitive necessitating careful kettle monitoring and temperature control; (c) narrower temperature application range because of (a) and (b) preceding cannot heat the modified asphalt to high temperatures to compensate for cold equipment and ambient temperatures; (d) the use of temperature stable elastomers is often extremely costly; (e) hot mopping asphalts are difficult to use on high commercial buildings; (f) the compatibility of an elastomer in an asphalt is difficult, most elastomers are only stable in selected asphalts; (g) torch application of modified bitumen membranes is often prohibited within certain municipalities due to insurance issues and fire safety; and (h) in prior cold process modifications improper selection of solvents either caused incompatibility (separation) in the container or the formulation to use minimal quantities of elastomers to gain compatability such that the cured coating does not exhibit truly modified properties.

PRIOR ART

U.S. Pat. No. 4,196,115 discloses blends of asphalt and various copolymers in roofing formulations for desirable low temperature properties. U.S. Pat. No. 4,609,696 discloses asphalt, rubber emulsions containing various solvents, to decrease viscosity, making the formulations sprayable at ambient conditions. U.S. Pat. No. 4,430,465 discloses the use of cyclohexanone as an additional anti-stripping agent, in asphalt compositions, additionally containing petroleum hydrocarbon resins, and a highly branched organic amine.

SUMMARY OF THE INVENTION

It has now been found that roofing compositions, especially adapted for cold application, comprising asphalt, a copolymer elastomer, and a solvent for both the asphalt and the elastomer, are greatly improved by the utilization of cyclohexanone as a cosolvent. The resulting compositions have improved performance properties such as elasticity, resiliency, plyability, durability, applicability, flame resistance, and adhesion, thus yielding high performance and longer lasting roofing systems. Inert fillers and fibers can also be included and are often desirable.

The introduction of cyclohexanone as a cosolvent surprisingly permits true and nearly ideal interaction between the asphalt and elastomers in both the adhesive's cured and uncured states. In the uncured, or liquid state, cyclohexanone efficiently solvates the elastomer and asphalt minimizing phase separation associated with incompatibilities among the solvents, asphalts and elastomers. In the curing and cured states, it controls the elastomers matrix development through the asphalt adhesive. It promotes chemical and mechanical bonding between the adhesive and membrane and adhesive and substrate by virtue of its solvency powers and evaporation rates. The combination of these properties all result in the aforementioned performance improvements, without the detrimental environmental and health hazards associated with other elastomer solvents.

Cyclohexanone successfully solvates the elastomeric copolymers such that each stays in a dispersed solution rather than forming an incompatible gel or phase separation. This dissolution allows the elastomers to be uniformly dispersed throughout the asphalt system. Upon cosolvent evaporation, a modified asphalt coating, cement or adhesive of desired thickness with maximum and uniform properties results, exhibiting enhanced adhesion, elasticity, recovery, cohesive strength, etc. The elastomeric copolymer gives up the co-solvent with cyclohexanone, rather than retaining the cosolvent in a gel type structure. Additionally, the strong solvent power of cyclohexanone assists in bond formation between the modified bitumen membrane and the modified cement or coating.

The ability of incorporating the elastomer in a cold applied coating and/or cement eliminates most of the problems in (a) through (h) previous. The use of the co-solvent, cyclohexanone, allows various elastomers to be incorporated in the asphalt in significant quantities to yield elastomeric/modified properties; without compatability/separation problems; a cold applied coating and cement can be safely used/applied at colder temperatures. A modified cold applied coating allows a modified asphalt to be used in municipalities where torches are prohibited and a building's height prohibits hot mop asphalt or modified asphalt application.

DETAILED DESCRIPTION OF THE INVENTION

The asphalt employed in this invention can be any of the well known bituminous substances derived from a number of materials such as, for example, petroleum, shale oil, coal tar and the like. Asphalt is a thick, viscous mixture of compounds such as, for example, paraffinic, cycloaliphatic and aromatic hydrocarbons and lesser amounts of heterocyclic compounds containg sulfur, nitrogen or oxygen. Although asphalt can be obtained from natural sources it is primarily derived as the residue of petroleum distillation (e.g. the bottom product of a vacuum distillation of a topped crude). Although this invention is not limited thereto, it is presently preferred that the asphalt have a penetration (ASTM D5) at 77 degrees F. dmm: ranging from about 30 to about 300 dmm and more preferably from about 50 to about 200 dmm and conform in general to specifications outlined by ASTM D312, D946 and/or D449.

The asphalt is utilized in an amount of about 20 to 90 parts by weight of a the total composition, with a preferred range of 35 to 55.

As the copolymer elastomer, use can be made to a large number of these materials, well known in the art. The elastomer is used in an amount of about 1–30 parts by weight, preferably 3–10. Typical of these elastomers are SBS (styrenebutadiene-styrene), EPR's EPDM's, butyl, SIS, SEBS and/or blends of these.

The choice of synthetic elastomers over natural rubbers and SBRs provides significantly improved performance properties in the cured (cosolvent evaporation) film, greater resiliencies, elasticities, adhesion and cohesion, and lower glass transition temperatures.

The third component is the solvent, any of a number of well-known aromatic or aliphatic organic hydrocarbon solvents, or combination thereof, able to solvate asphalt and at least some portion of the elastomer e.g. possibly one component of the copolymer. It should be miscible and compatible with cyclohexanone. Typical solvents include but are not limited to: mineral spirits, kerosene, fuel oils, gasoline, VM&P Naptha, etc. The solvents should be non-flammable, non red label, non photo chemically active, and non environmentally harmful.

The solvent is utilized in an amount ranging from about 0 to 30 parts by weight of the total composition. Preferred is a range of 10–25 parts by weight of the total composition.

The cyclohexanone is utilized in an amount of from 4 to 35 parts by weight of the total composition, preferred range 5–15 parts by weight.

For purposes of thickening and/or reinforcing the adhesive, inert organic and/or inorganic fillers known in the art may be added. They are utilized in an amount from about 0 to 30 parts by weight of the total composition with a preferred range being 2 to 10 parts by weight of total composition. Typical inert fillers may be clays, calcium carbonates, talcs, and the like.

Fibers also can be advantageously added, in an amount of from 0 to 20 parts by weight of the total composition, preferably 2 to 10. the fibers well known in the art can be organic or inorganic e.g. asbestos, synthetics, cellulosics, etc.

Minor inert diluents or extenders can be feasibly incorporated into the formula without harmfully affecting the intent of this invention and the overall performance properties. The solvent mixture may contain other minor solvents such as chlorinateds, aromatics, etc., truly constituting a tertiary or greater solvent mixture, yielding the same or enhanced properties. Other solvents may be incorporated for cost reasons, to alter cure times, or to improve the cured films fire resistance.

Coating and adhesive compositions viscosities @ 77 degrees Fahrenheit should have a viscosity range from 25–400 Stormer seconds per 100 revolutions under a 450 gram working load, as tested via ASTM D4479-85. Cements should have a consistency @ 77 degrees Fahrenheit ranging from 150 to 400 dmm as evaluated per ASTM D5-86 utilizing a standard grease cone needle with a total working load of 150 grams for a period of 5 seconds.

A distinct advantage of this co-solvent mixture allows these formulations to be prepared in conventional mixing equipment without the need for heated/elevated temperatures, shear or high shear mixers, powderized elastomers, or similar more costly or upgraded mixing equipment.

The preferred method of formulation consists of:

First, adding the cosolvent and elastomer to a mixer of suitable size for the entire batch and mixing or circulating well until the elastomer is dissolved.

Second, adding an asphalt cutback (asphalt dissolved in mineral spirits, fuel oil, etc.) and mixing/circulating well.

Third, adding reinforcing fibres and/or fillers/extenders.

Fourth, adding other components as desired. Variations of the preferred method are possible and may consist of:

Mixing the elastomer and cyclohexanone as an admixture and adding to a prepared mixture of asphalt, solvent, and other ingredients.

Using an asphalt dissolved totally in cyclohexanone and adding the elastomer directly to this cutback blend.

Dispersing the elastomer in a compatible hot asphalt and subsequently dissolving the dispersion in cyclohexanone or a co-solvent mixture containing cyclohexanone. The remaining ingredients are added thereto. Minor enhancing ingredients can be added at any stage, preferably the first. The resulting composition, dependent upon the elastomers and asphalt selected will exhibit:

(a) Elongation exceeding 100%.
(b) Recoveries after a maintained elongation for 1 hour of greater than 95%.
(c) Improved cold temperature flexibilities (lower glass transition temperatures).
(d) Improved adhesion (bond) strengths.
(e) Reduced application coverages.
(f) Improved high temperature (roof top temperatures, 120–180 degrees Fahrenheit) properties of: adhesion, resiliency, etc.

The method of application to the roof is well known and need not be elaborated here.

This invention will be better understood by reference to the following examples:

EXAMPLE 1

A modified bitumen adhesive was formulated with an SBS elastomer, cyclohexanone, AC-20 asphalt, mineral spirits,, non asbestos fibres to the physical requirements as outlined by ASTM D4479-85, Asphalt Roof Coatings, Asbestos Free, whereby at recommended application rates of $\frac{3}{4}$ gal per 100 ft$^2$ yielded lap strengths equal to or greater than conventional cold application adhesives, hot mopping asphalts, or heat applied welded bonds, were obtained.

EXAMPLE 2

A modified bitumen flashing cement was formulated with an SBS elastomer, cyclohexanone, AC-20 asphalt, mineral spirits, non asbestos fibres, and inert fillers to the physical requirements as outlined by ASTM D4589-86, Asphalt Roof Cement, Asbestos Free, whereby superior adhesion and flexibility in the cured cement was exhibited, especially where dissimilar materials are to be joined. Resistance to cold temperature thermal cracking was greatly improved.

EXAMPLE 3

A modified bitumen concrete joint sealant and/or mastic, was formulated with an SBS elastomer, cyclohexanone, AC-20 type asphalt, mineral spirits, non asbestos fibres and chemical surfactants whereby the finished product provided superior adhesion to wet concrete surfaces such as expansion joints in concrete roadwork, tarmacs, parking lots, etc., and exhibited superior cold temperature flexibility without loss of adhesion.

EXAMPLE 4

A modified bitumen pitch pan filler was formulated with an SBS elastomer, co-solvent mixture of cyclohexanone and mineral spirits, AC-20 type asphalt, non-asbestos fibers and chemical surfactants whereby the finished product exhibited superior adhesion to pitch pans and the stantion contained therein; resisting age hardening, thermal cracking, disbonding, etc. which ultimately may lead to leaks via the pitch pan.

EXAMPLE 5

A modified bitumen adhesive was formulated with an SBS elastomer, cyclohexanone, AC-20 asphalt, mineral spirits, and non asbestors fibres to the physical requirement as outlined by ASTM D4479-85, Asphalt Roof Coatings, Asbestors Free. At application rates of ¾-2 gallons per 100 ft(2), a cold applied roofing membrane system with one or more plys of inorganic reinforcing fabrics such as fibre glass ply sheets, polyester fabrics, and/or fibre glass/polyester woven or non woven mesh or combination thereof was constructed. The system exhibited significantly improved properties (system: resiliency, tensile strength, cold temperature pliability) over analagous systems using hot mop asphalts, or existing modified or non modified cold applied adhesives.

EXAMPLE 6

The folowing examples of formulations are typical for the preparation of modified cold asphalt formulations, employing cyclohexanone as a co-solvent. The amounts of ingredients are expressed in terms of parts by weight per 100 parts by weight of asphalt.

| Example A | |
| --- | --- |
| Asphalt | 100 |
| Solvent | 40–45 |
| Cyclohexanone | 20–25 |
| Elastomer | 5–10 |
| Wet Surface Adhesion Additive | 0–2 |
| Organic Fiber | 0–4 |
| Inorganic Filler | 10–15 |
| Example B | |
| Asphalt | 100 |
| Solvent | 40–45 |
| Cyclohexanone | 40–45 |
| Elastomer | 20–25 |
| Wet Surface Adhesion Additive | 0–2 |
| Organic Fiber | 15–20 |
| Inorganic Filler | 35–40 |
| Example C | |
| Asphalt | 100 |
| Solvent | 40–45 |
| Cyclohexanone | 10–15 |
| Elastomer | 5–10 |
| Inorganic Filler | 15–20 |

EXAMPLE 7

Bond strengths associated with the modified cold formulations exhibit equivalent strength to conventional hot mopped or torch applied systems, without the associated fire hazards.

| Lap Shear Strength @ full Cure: SBS Systems | | | |
| --- | --- | --- | --- |
| | lbs/2 in width | | |
| SBS membrane hot mopped | 143(1) | 111(1) | 81(2) |
| SBS membrane cold modified adhesive | 150(1) | 140(1) | 97(2) |
| adhesive Tested @: | 32 | 77 | 120 |
| (degrees in Fahrenheit) | | | |

(1) Membrane failure
(2) Bond failure

| Lap Shear Strength @ full Cure: APP Systems | | | |
| --- | --- | --- | --- |
| | lbf/2 in width | | |
| APP membrane hot mopped | 150(1) | 138(1) | 107(3) |
| APP membrane cold modified adhesive | 150(1) | 126(2) | 75(2) |
| Tested @: | 32 | 77 | 120 |
| (degrees in Fahrenheit) | | | |

(1) Membrane failure
(2) Polyethylene backing failure
(3) Bond failure

These examples show improved bond strength, while removing undesirable characteristics associated with conventional materials.

EXAMPLE 8

Percent Elongation at Break @ 77 degrees Fahrenheit

| Sample | % Elongation |
| --- | --- |
| Modified adhesive with cyclohexanone as a co-solvent | 380 |
| A* | 165 |
| B* | 105 |
| C* | 95 |
| D* | 139 |
| E* | 103 |
| F* | 14 |
| G* | 10 |
| H* | 66 |
| I* | 114 |

\* = Competitive modified cold applied adhesives not utilizing cyclohexanone as a co-solvent.

These demonstrate the improved properties resulting from the compositions of their invention as compared to conventional formulations.

EXAMPLE 9

Percent Recovery at Break @ 90% of Maximum Elongation

| Sample | % Recovery * |
| --- | --- |
| Modified adhesive employing cyclohexanone | 96 |
| A1 | 20 |
| B1 | 12 |
| C1 | 9 |
| D1 | 53 |
| E1 | 72 |

\* = Samples tested at 77 degrees Fahrenheit, recovery time equal to 4 hours. Maximum elongation = elongation at break.
1 = Competitive sample not utilizing cyclohexanone as a co-solvent.

These demonstrate the improved properties resulting from the compositions of their invention as compared to conventional formulations.

It should be noted that the superior results in these examples were obtained along with the very desirable reduced toxicity and flammability. In all cases the amounts of components were within the prescribed ranges.

The advantages of this invention will be apparent to those skilled in the art from the foregoing. Compositions are provided with enhanced adhesion and performance that match or exceed modified bitumen roof membranes. Disadvantages of past application techniques are avoided. The solvent systems are environmentally safe and acceptable. Improved properties are obtained with reduced usage levels. The formulations comply with strict governmental regulations.

The compositions of this invention can also find utility in areas in addition to roofing such as road paving and construction, where the enhanced properties also enhance the performance of the systems utilized.

The compositions of this invention can be emulsified with water thereby providing further use versatility.

It is to be understood that this invention is not limited to the specific examples which have been offered as particular embodiments and that modifications can be made without departing from the spirit thereof.

What is claimed is:

1. A roofing composition especially adapted for cold applications consisting essentially of:

|   | Parts By Weight (Based on Total Composition) |
|---|---|
| 1. asphalt having a | 20–90 |
| 2. synthetic hydrocarbon copolymer elastomer | 1–30 |
| 3. an organic hydrocarbon solvent for said asphalt and at least partially for said synthetic copolymer elastomer which is miscible with cyclohexanone | 0–30 |
| 4. cyclohexanone | 4–35 |
| 5. inert filler | 0–30 |
| 6. fiber | 0–20 |

2. The composition of claim 1 having the following parts by weight:

|   | Parts by Weight |
|---|---|
| 1. asphalt | 35–55 |
| 2. elastomer | 3–10 |
| 3. solvent | 10–25 |
| 4. cyclohexanone | 5–15 |
| 5. inert filler | 2–10 |
| 6. fiber | 2–10 |

3. The composition of claim 2 in which the elastomer is SBS and the solvent is mineral spirits.

* * * * *